(12) United States Patent
Dettman et al.

(10) Patent No.: US 9,703,536 B2
(45) Date of Patent: Jul. 11, 2017

(54) DEBUGGING CODE USING A QUESTION AND ANSWER SYSTEM BASED ON DOCUMENTATION AND CODE CHANGE RECORDS

(71) Applicant: International Business Machines Corporation, Armonk, NY (US)

(72) Inventors: Elizabeth T. Dettman, Rochester, MN (US); Joel C. Dubbels, Rochester, MN (US); Andrew R. Freed, Cary, NC (US); Michael W. Schroeder, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 14/456,838

(22) Filed: Aug. 11, 2014

(65) Prior Publication Data
US 2016/0042275 A1     Feb. 11, 2016

(51) Int. Cl.
*G06N 5/00*       (2006.01)
*G06F 9/44*       (2006.01)
*G06F 11/36*      (2006.01)
*G06F 11/07*      (2006.01)

(52) U.S. Cl.
CPC ............. *G06F 8/37* (2013.01); *G06F 11/366* (2013.01); *G06N 5/003* (2013.01); *G06F 11/0703* (2013.01); *G06F 11/079* (2013.01)

(58) Field of Classification Search
CPC .................................................... G06N 5/003
USPC ........................................................... 706/46
See application file for complete search history.

(56) References Cited

U.S. PATENT DOCUMENTS

| | | | |
|---|---|---|---|
| 7,712,087 B2 | 5/2010 | Kogan et al. | |
| 7,797,684 B2 | 9/2010 | Prakash | |
| 8,032,866 B1 | 10/2011 | Golender et al. | |
| 8,407,667 B2 | 3/2013 | Stenberg et al. | |
| 8,589,882 B2 | 11/2013 | Shochat et al. | |
| 8,589,889 B2 | 11/2013 | Kim et al. | |
| 8,595,703 B2 | 11/2013 | Van Gogh et al. | |

(Continued)

OTHER PUBLICATIONS

Disclosed Anonymously ("Explaining why question-and-answer system answers change over time by listing the most relevant changes to the question-and-answer system" Jan. 2014.*

(Continued)

*Primary Examiner* — Lut Wong
(74) *Attorney, Agent, or Firm* — Stephen J. Walder, Jr.; Diana R. Gerhardt

(57) ABSTRACT

Mechanisms are provided, in a Question and Answer (QA) system comprising a processor and a memory, for debugging code. An input question identifying an error during execution of code is processed by the QA system using a corpus corresponding to a software product associated with the code, thereby generating a first candidate answer set. The QA system processes the input question using a code change record repository identifying changes to the code performed over time to generate a second candidate answer set. The QA system generates a final answer to the input question based on the first and second candidate answer sets and outputs the final answer to the input question. The final answer to the input question identifies at least one of a source, in the code, of the error or a solution to resolving the error.

16 Claims, 6 Drawing Sheets

(56) References Cited

U.S. PATENT DOCUMENTS

| | | | |
|---|---|---|---|
| 2008/0244534 A1 | 10/2008 | Golender et al. |
| 2008/0250394 A1 | 10/2008 | Jones et al. |
| 2009/0287678 A1 | 11/2009 | Brown et al. |
| 2011/0066587 A1 | 3/2011 | Ferrucci et al. |
| 2011/0125734 A1 | 5/2011 | Duboue et al. |
| 2012/0110030 A1 | 5/2012 | Pomponio |
| 2012/0159247 A1 | 6/2012 | Johnson et al. |
| 2012/0204151 A1 | 8/2012 | Ientile et al. |
| 2013/0007055 A1 | 1/2013 | Brown et al. |
| 2013/0018652 A1 | 1/2013 | Ferrucci et al. |
| 2013/0066886 A1 | 3/2013 | Bagchi et al. |
| 2013/0074036 A1 | 3/2013 | Brandt et al. |
| 2013/0117730 A1 | 5/2013 | Wisniewski |
| 2014/0007049 A1 | 1/2014 | Bragdon et al. |

OTHER PUBLICATIONS

Cordeiro et al ("Context-Based Recommendation to Support Problem Solving in Software Development" IEEE 2012).*

Disclosed Anonymously, "Explaining why question-and-answer system answers change over time by listing the most relevant changes to the question-and-answer system", An IP.com Prior Art Database Technical Disclosure, IPCOM000234018D, Jan. 7, 2014, 5 pages.

IBM, "System that Allows Document Editor to be Linked to and Code Development Environments and Source Control Systems", An IP.com Prior Art Database Technical Disclosure, IPCOM000171996D, Jun. 24, 2008, 5 pages.

High, Rob, "The Era of Cognitive Systems: An Inside Look at IBM Watson and How it Works", IBM Corporation, Redbooks, Dec. 12, 2012, 16 pages.

Lee, Mu-Woong et al., "Integrating Code Search into the Development Session", IEEE, ICDE Conference 2011, Apr. 11-16, 2011, pp. 1336-1339.

Yuan, Michael J., "Watson and healthcare, How natural language processing and semantic search could revolutionize clinical decision support", IBM developerWorks, IBM Corporation, Apr. 12, 2011, 14 pages.

Zanoni, Julio C. et al., "A Semi-Automatic Source Code Documentation Method for Small Software Development Teams", Proceedings of the 2011 15th International Conference on Computer Supported Cooperative Work in Design (CSCWD), IEEE, Jun. 8-10, 2011, pp. 113-119.

* cited by examiner

| QA SYSTEM BASED CODE DEBUGGER ||
|---|---|
| QUESTION: WHY WILL WHIZBANG 2.0 NOT START UP ON MY POWER SYSTEM? | STACK TRACE:<br>   Cannot read WHIZGANGCONFIG value at WhizBangLoader.loadWhizBangConfig: 47<br>   at WhizBangStartup.initialize: 13 |
| ANSWER: | EVIDENCE: |
| WHIZBANGCONFIG property not set | Infocenter: Must set WHIZBANGCONFIG environment variable<br>Change Request 146: Allow override of WHIZABANGCONFIG<br>Change Set 200: Several updates to loadWhizbangConfig()<br>Change Set 202: Updates to readCommandLine() which is called by loadWhizbangConfig() |
| Must run on Linux | Infocenter: Must run WhizBang 1.0 on Linux operating system. |

FIG. 5

DEBUGGING CODE USING A QUESTION AND ANSWER SYSTEM BASED ON DOCUMENTATION AND CODE CHANGE RECORDS

BACKGROUND

The present application relates generally to an improved data processing apparatus and method and more specifically to mechanisms for debugging code using a question and answer (QA) system based on code documentation and code change records.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a Question and Answer (QA) system comprising a processor and a memory, for debugging code, is provided. The method comprises receiving, by the QA system, an input question identifying an error encountered during execution of code and processing, by the QA system, the input question using a corpus of information content corresponding to a software product associated with the code to generate a first set of candidate answers for the input question. The method further comprises processing, by the QA system, the input question using a code change record repository identifying changes to the code performed over time to generate a second set of candidate answers for the input question. In addition, the method comprises generating, by the QA system, a final answer to the input question based on the first set of candidate answers and the second set of candidate answers. Furthermore, the method comprises outputting, by the QA system, the final answer to the input question, wherein the final answer to the input question identifies at least one of a source, in the code, of the error or a solution to resolving the error.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 is an example diagram of an output that may be generated in accordance with one illustrative embodiment.

DETAILED DESCRIPTION

Figure 1:
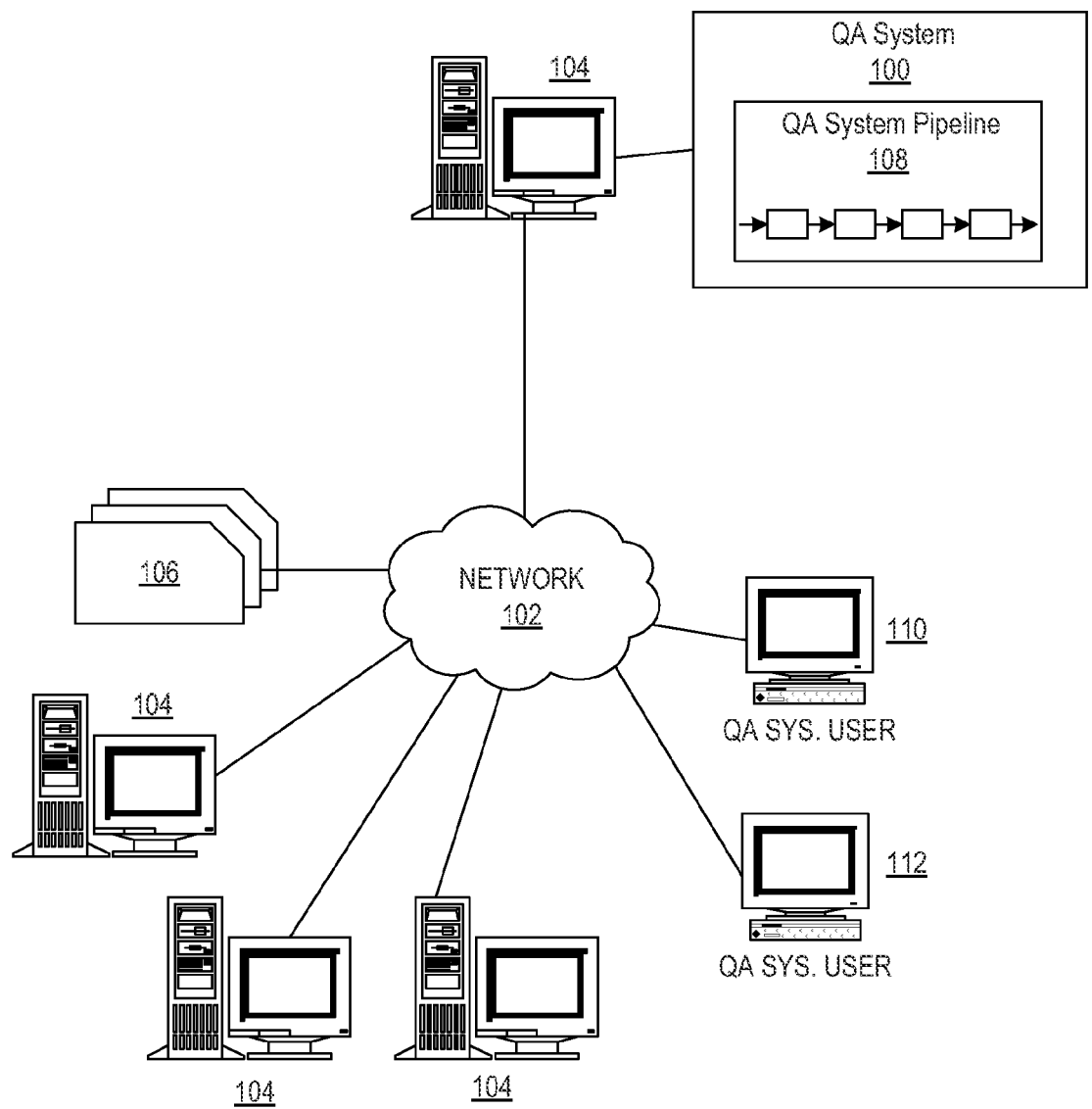
FIG. 1 depicts a schematic diagram of one illustrative embodiment of a question/answer creation (QA) system in a computer network.

The illustrative embodiments provide mechanisms for debugging code using a question and answer (QA) system based on code documentation and code change records. It is difficult to debug complex code problems that cause differing behaviors of code based on the particular environments in which the code is executed. For example, one might ask "why does the code work on my computer but not yours?" Moreover, code problems in general are just sometimes very difficult to rectify due to the complexity of the code itself. This is especially true during code development when multiple users are all making changes to the code at substantially a same time and may be modifying different areas of code in different ways that may not always be compatible with one another.

While one can search a knowledge base for answers, the knowledge base itself often lags behind the latest code environment, i.e. documentation of the code is not always up to date with the current state of the code. Documentation of code being out-of-date is a frequently encountered problem since code documentation is usually the last part of the development that is updated. This causes problems in that the documentation may offer answers to resolve a bug in the code that are inaccurate based on the current state of the code. Moreover, reading the code itself may be a very labor intensive endeavor requiring experienced users to analyze the code and determine the source of the bugs. This is a troublesome approach especially if one is not well-versed in the execution flows of the particular code in question.

The mechanisms of the illustrative embodiments utilize a Question and Answer (QA) system, such as the IBM Watson™ QA system available from International Business Machines (IBM) Corporation of Armonk, N.Y., to answer questions regarding debugging of computer program code based on available code documentation as well as change records within the code itself. In considering not only the code documentation, but also the change records within the code itself, the problems associated with out-of-date code documentation are largely overcome. The code change records tend to be the most up-to-date information about what the current state of the code is and the history of changes made to the code. Correlating this information with the available code documentation gives a more complete understanding as to the possible answers to questions regarding debugging of the execution of the computer program code.

Thus, an example scenario may be a code development team developing a new version of computer program code, e.g., DoSomething code version 2.0, but may only have access to the code documentation for DoSomething code version 1.0 and some design documentation (which itself may be out-of-date). The mechanisms of the illustrative embodiments may utilize this information as well as code change records to give a greater insight to the development team of the possible sources and solutions to code bugs than the development team may have based on only the out-of-date previous version documentation and design documentation.

In one illustrative embodiment, the mechanisms of the illustrative embodiments include a QA system that has been trained with a corpus comprising one or more user manuals, code documentations, and other documentation corresponding to the code for which questions may be submitted to the QA system. This corpus of information may have, in association with the user manuals, code documentations, and the like (hereafter referred to as "code documentation sources") in the corpus, information about the date, version, or the like (hereafter referred to as the effective date/time), indicating the state of the code to which these code documentation sources correspond.

In addition to the corpus of manual/code documentation information, the QA system may further be provided with access to a code change record/source control repository that identifies changes to the code and the time/date/version corresponding to the change in the code. In some embodiments, the code change record/source control repository may store a history of changes to the code such that if multiple changes to the same portion of the code are performed over time, this history of changes may be maintained in the repository. Thus, in addition to generating a candidate answer to a debugging question based on the corpus of code documentation sources, the QA system may further check the code change record/source control repository information to identify code changes that occurred after the effective date/time of the code documentation sources to determine possible alternative or additional candidate answers to the question. It should be appreciated that in some illustrative embodiments, the code change record/source control repository may in fact be integrated into the corpus of code documentation sources and used during candidate answer generation rather than being consulted as a separate source of information.

Thus, in an example scenario, it is assumed that a QA system is provided in accordance with the illustrative embodiments, i.e. trained on a corpus of code documentation sources, such as a software product's infocenter and related documentation, e.g., design documents, wiki information, and the like. Each of these portions of information about the software product is ingested by the QA system in a manner generally known in the art of natural language processing. The QA system further records the publication dates, version information, or other appropriate effective date/time information from these code documentation sources.

It should be appreciated that the term "software product" refers to one or more portions of code, or software applications (applications are collections of code), that together perform a useful function. Thus, code is a subset of a software application, which in turn is a subset of a software product. Software products may be associated with code yet may be separate from that code, e.g., a software product of an earlier version of code may be separate and distinct from a current version of code, yet both versions may be associated with the same overall software product. Moreover, software products may be associated with current code by being similar to the current code in functionality, purpose, or the like. Thus, when it is stated in this description that the software product is associated with the code, any relationship for associating the software product with the code is intended, whether that relationship be subsequent versions of the software product, a software product having code that performs similar operations to the current code, or the like.

Continuing on, at a later time, after the training of the QA system and ingestion of the corpus, a problem is encountered such as when running the software product in a runtime environment or during development of a new version of the software product in a development environment, when performing software modifications to the existing software product, implementing the software product in a new execution environment, or the like. The problem is described to the QA system in a natural language question or statement to thereby form an input question for the QA system to parse and process. It should be appreciated that this input question may be augmented with stack trace information, error log entries, and other information/data providing information about the encountered error or bug (also referred to herein as "code error information"), that may have been generated during execution of the software product when the error occurred.

The QA system processes this input question and associated code error information to generate queries that are applied to the corpus of code documentation source information to determine candidate answers to the question. The QA system identifies the effective date/time associated with the evidence sources from which the candidate answers are generated, e.g., publication date of the software product's user manual, version number for which the user manual is valid, date/time of posting of a statement of portion of content to a website, etc. Optionally, this initial set of candidate answers may be output to the user who can either accept the candidate answers or request that the candidate answers be augmented with evidence from analyzing the latest code change records/source control repository information. Alternatively, the consulting of the latest code change records/source control repository information may be performed automatically without requiring a user to request such.

Either automatically, or in response to a user requesting augmentation of the candidate answers, the question and the candidate answers are processed into keywords or n-grams. In addition, the code changes that occurred after the effective date/time of the code documentation sources is determined from the code change records/source control repository information. The code changes that occurred after the effective date/time are then searched using the keywords or n-grams and a scoring/ranking algorithm is applied to the results. In scoring the results of the comparison of the code changes to the keywords or n-grams various features may be evaluated to determine a score/rank including, for example, a search engine ranking, inverse document frequency (IDF) of the keywords or n-grams in the evidence, age of the evidence results (older evidence being less likely to be correct than newer evidence), lines of code (LOC) in the change indicating a size of the change (in some cases smaller changes may be more likely to be a source of a bug than larger changes, or vice versa), determining if a matching class/method in the code is directly in the stack trace, evaluating portions of code near a matching class/method in the stack trace, minimum distance of the class/method from the classes/methods in the stack trace, and the like, as will be described in greater detail hereafter.

This information may be used to generate further candidate answers, filter or modify the scoring/ranking of the previously generated candidate answers, or the like. Results may be generated and output to the user as answers to the question regarding the reasoning behind the encountered problem and possible solutions to the encountered problem. This information may be returned to a user that submitted the problem indication or other specified notification recipient, such as a project leader, development team leader, or the like. Thus, personnel that need to be notified of the possible sources of bugs in code and their potential solutions are informed as to this information based on the most up to date information from not only the code documentation which typically lags behind the current state of the code during development, but also based on the current state of the code as defined by the change records/source control repository information for the code. The question itself may be augmented with information from the trace of the execution of the code that caused the problem to be identified, e.g., stack trace, log entries, and the like. Answers may be weighted and scored according to this additional change record/source control repository information in various ways to achieve a ranked listing of the most probable solutions to the encountered code bug or problem. Thus, the most up-to-date information about the code is used as a basis for performing debug operations using a QA system.

Before beginning the discussion of the various aspects of the illustrative embodiments with reference to the figures, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
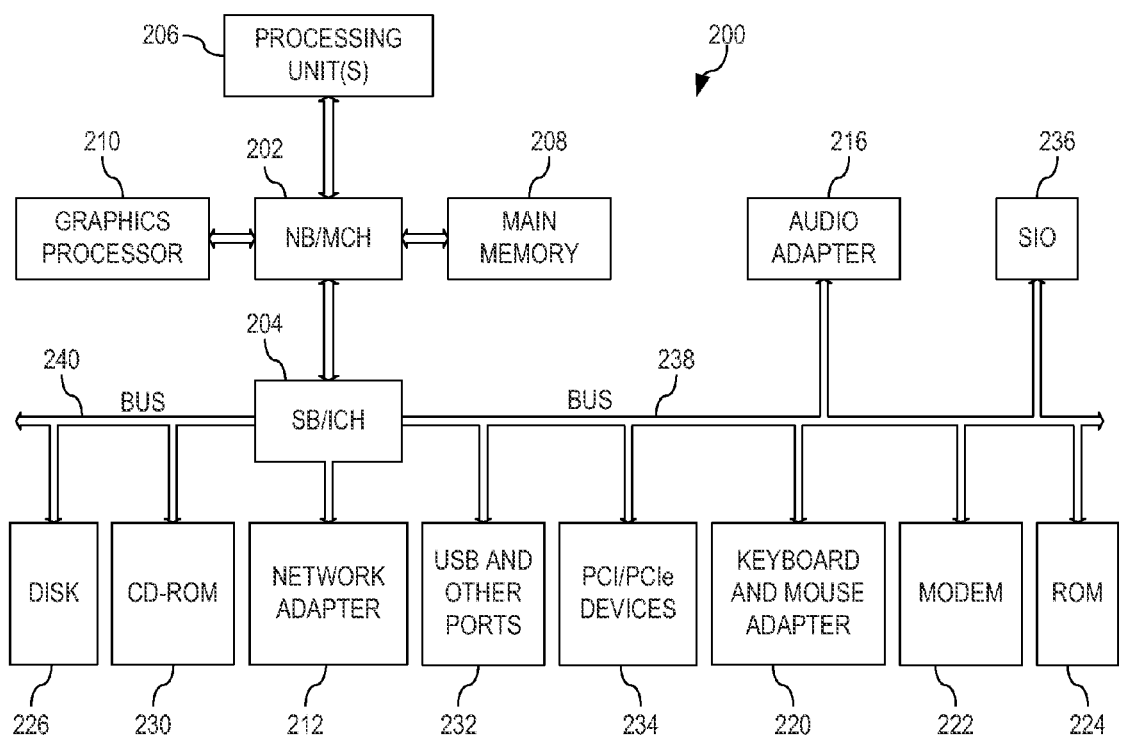
FIG. 2 is a block diagram of an example data processing system in which aspects of the illustrative embodiments may be implemented.
Figure 3:
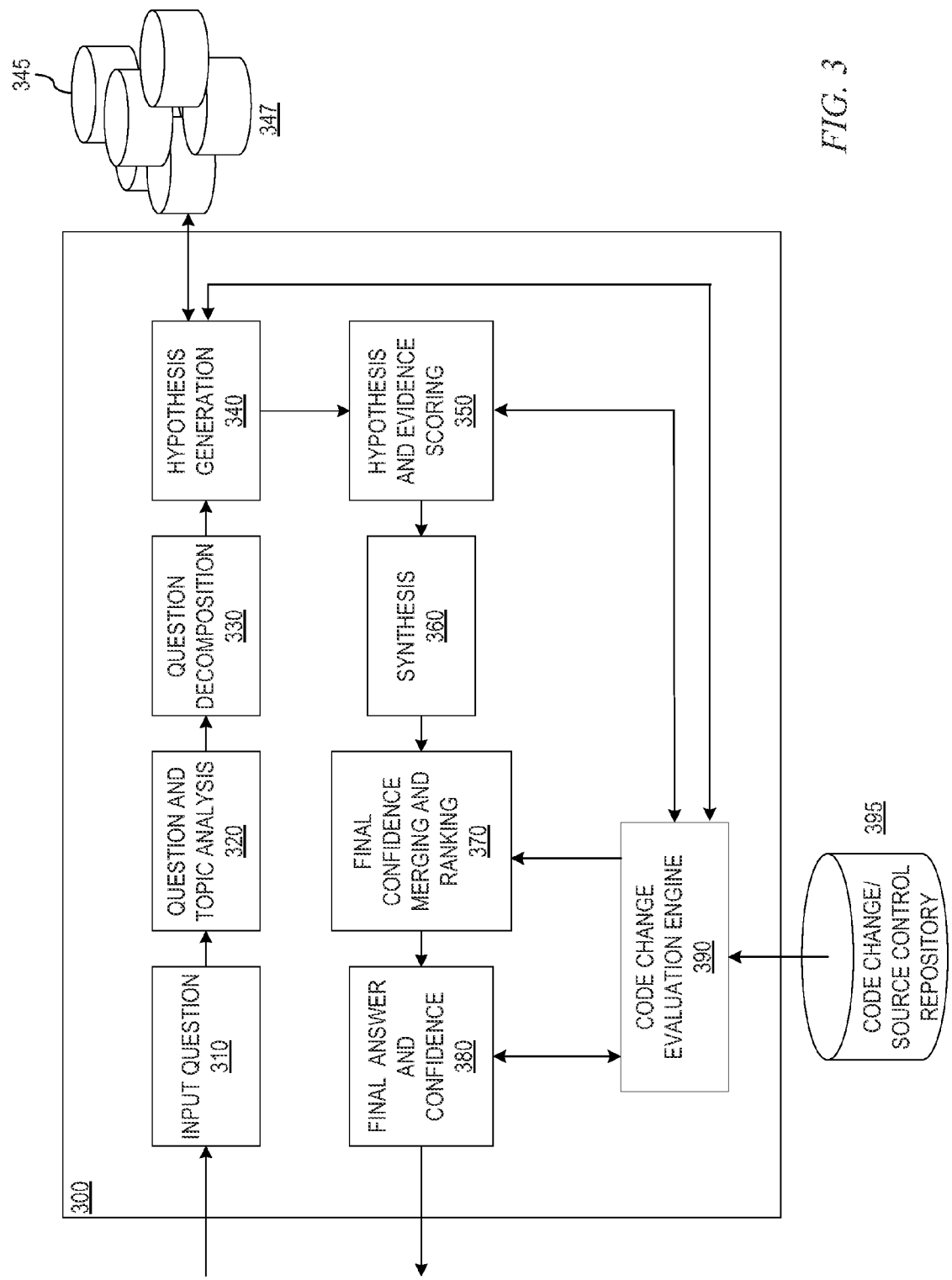
FIG. 3 illustrates a QA system pipeline for processing an input question in accordance with one illustrative embodiment.

It should further be appreciated that the illustrative embodiments may be utilized in many different types of data processing environments but is most suited for a data processing environment in which a Question and Answer (QA) system is implemented for answer natural language input questions based on the analysis of a corpus or corpora of information provided in a structured or unstructured natural language form. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example QA system, methodology, and computer program product with which the mechanisms of the illustrative embodiments may be implemented. As outlined above, and discussed in greater detail hereafter, the illustrative embodiments may be integrated in, and may augment and extend the functionality of, the QA mechanisms with regard to performing debugging of code using natural language question processing and a corpus comprising code documentation pertinent to the code being debugged. In this context, the question is in fact a report of the encountered bug with an implicit request to identify a possible source/solution for rectifying the encountered bug. In addition, mechanism are provided for processing code change records and/or control structure repository information for a project in which the code being debugged is stored to indicate changes in the code and their corresponding date/time of implementation. The processing of these code change records and/or control structure repository information may be used to modify the scoring/ranking of candidate answers generated from the corpus or corpora, generate additional candidate answers, or both. The resulting scored/ranked candidate answers may then be used to generate an answer to output to the submitter of the input question.

Since the mechanisms of the illustrative embodiments are utilized with a QA system, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. The IBM Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® or Power™ processor computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345. That is, these various sources themselves, different collections of sources, and the like, may represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question. After stage 380, or as part of stage 380, the set of candidate answers is output via a graphical user interface.

In accordance with the illustrative embodiments, the corpora 347 or corpus 345 comprises code documentation, user manuals, and other documentation in an electronic form that describes a software product or software project to which the input question 310 corresponds. The corpora 347 may comprise a plurality of corpus 345 with each corpus directed to a different domain, and with the domains being associated with different software products or software projects. It should be appreciated that the particular corpus 345 or corpora 347 used by the QA system 300 to answer a particular input question 310 associated with an error or bug found in a software product or software project may be determined based on analysis of the input question 310, as discussed above, to extract features from the input question 310 that identify the particular domain to which the input question 310 applies. However, it should be appreciated that this domain may comprise documents, text, or other information content that is for a previous version of the software product/project, may be associated with a related but different software product/project, or may otherwise be out-of-date or not current with the current state of the software product/project. The information in the corpus 345 or corpora 347 may be in a structured or unstructured natural language format.

The input question 310, in accordance with the illustrative embodiments, may be posed as a natural language question generated by a user describing a code error/bug that was encountered, or may be an automatically generated report of an error or bug found in the execution of the code of a software product/project. The input question 310 may further have associated with it a stack trace, log entries, or any other error identification information or trace information generated regarding the execution of the code leading to or otherwise documenting the encountered error/bug in the software product/project. This information as a whole may constitute the input question 310 and may be subject to the processing by the QA system pipeline 300. That is, the error report, stack trace, log entries, and the like, may together be input to the QA system pipeline 300 as a natural language input question 310, which is then parsed to extract relevant features for question and topic analysis 320, decomposition 330, and hypothesis generation 340. The hypothesis and evidence scoring 350, synthesis, final merging and ranking 370, and final answer and confidence output 380 may be performed in a similar manner as previously described above, but may also be improved with the addition of the code change evaluation engine 390 as will be described in greater detail hereafter.

The extraction of features may be augmented with logic specifically configured to identify pertinent features for code debugging and bug/code error source and solution identification. For example, one or more annotators, specifically configured with logic for handling code debugging and error analysis, may be utilized in stage 320 and/or stage 330 to extract features from the input question 310 and decompose the input question 310 into queries to be applied to the appropriate domains in the corpus 345 or corpora 347. For example, as mentioned above, the input question 310 may comprise an error report, stack trace, log entries, or the like. In the case of a stack trace, for example, the input question 310 may be processed by one or more annotators to extract the class name, method name, LOC, or the like, associated with the error that was encountered. Moreover, the stack trace may be further analyzed to identify what methods were being called at the time of the error. From this information, the mechanisms of the illustrative embodiments may look for code changes to the identified class/method that generated the error, code changes to the classes/methods that were being called at the time of the error, changes to classes/methods within the call stack itself, and the like. In some cases, the name of the class/method itself gives an indication of the nature of the error, e.g., if the stack trace ended at WhizBangConfig.loadConfigFile it can be determined through natural language processing analysis on the class/method name itself that the error has something to do with loading the configuration file for the WhizBang application.

As described previously, the QA system pipeline 300 may analyze the input question 310 by applying queries to the corpus 345 or corpora 347 to generate one or more hypotheses, e.g., candidate answers, for answering the input question 310, which in the case of code debugging may be the identification of the potential source of the code error/bug and/or a possible solution for rectifying the code error/bug. However, the documentation and information content in the corpus 345 or corpora 347 that is used as a source for generating these hypotheses or candidate answers may be out-of-date or otherwise not completely accurate to the current state of the code in which the error/bug was encountered. This is often the case when software is being developed and the documentation for the software has not yet been updated, or even created, to reflect the current state of the software. Thus, the candidate answers themselves may be out-of-date or inaccurate.

As shown in FIG. 3, in accordance with the illustrative embodiments, a code change evaluation engine 390 is provided in the QA system pipeline 300 for evaluating candidate answers (hypotheses), generating new candidate answers, or both, with regard to code change records and source control repository information 395. The code change records and source control repository information 395 stores information about the changes to the code made over time, the timestamps associated with these code changes, and source information identifying the source of the code changes, e.g., what person or persons were responsible for the code changes. Moreover, the code records and source control repository information 395 may store comments entered by users to describe the code changes, their purpose, why they were made, or any other pertinent information for documenting the code changes to permit understanding the code changes, what they do, and the reasons for their implementation.

For example, a source control repository may store a collection of code changes themselves (also referred to herein as "change records") and descriptions of requested code changes (also referred to as "work items"). The change records are collections of code additions, modifications, and removals, e.g., the particular five new lines of code added to the "WhizBangConfig" class. The work items provide a natural language description of what changes need or should be done to the code, e.g., "enhance configuration loading to read from binary files." Either in the source control repository, or another external system (not shown), a system of links are stored that link work items to change records, e.g., a work item "enhance configuration loading to read from binary files" may be linked to a change record that identifies the five lines of code added to the WhizBangConfig class that implements the work item.

The code change records and source control repository information 395 may expand the corpus 345 or corpora 347 and, in some illustrative embodiments, may actually be integrated into the corpus 345 or corpora 347 as additional sources of information upon which the QA system pipeline 300 may operate. In some illustrative embodiments, the code change records/source control information repository 395 may be separate from the code itself while in other embodiments, this repository 395 may be part of, and integrated in, the code itself such that the code change record/source control information repository 395 may be the code itself.

The code change evaluation engine 390 operates on the code change/source control repository 395 information in a similar manner to that of the hypothesis generation stage 340 in that the keywords/n-grams generated from decomposing the input question 310 into extracted features and queries are applied against the code change/source control repository 395 information to retrieve additional evidence passages for supporting already generated candidate answers (hypotheses) and/or identifying new candidate answers for inclusion in the listing of candidate answers for hypothesis and evidence scoring 350. A significant difference in the operation of the code change evaluation engine 390 from that of stage 340 is that the code change evaluation engine 390 operates on identified code changes and source control information having a timestamp after the effective date/time of the documentation and information content in the previously evaluated corpus 345 or corporate 347. That is, the candidate answers generated by the QA system pipeline 300 provide a first set of candidate answers based on the analysis of the input question 310 relative to the documents and information content of the identified domain in the corpus 345 or corpora 347, with the candidate answers in the first set of candidate answers having associated effective dates/times corresponding to the source dates/times, e.g., publication dates/times, posting dates/times, last modified dates/times, storage dates/times, etc. The code change evaluation engine 390 may generate additional supporting evidence passages for one or more of the candidate answers in the first set of candidate answers, and/or generate new candidate answers in a second set of candidate answers that augments the first set of candidate answers, with this additional supporting evidence passages and/or new candidate answers having effective dates/times that are after the effective dates/times of the candidate answers and supporting evidence associated with the first set of candidate answers. Thus, the code change evaluation engine 390 expands upon the candidate answers generated by the QA system pipeline 300 based on the established corpus 345 or corpora 347.

The code change evaluation engine 390 augments and extends the first set of candidate answers by looking at the code change records and source control information in the repository 395 that has an effective date/time that is after the effective date/time of the candidate answers in the first set of candidate answers. That is, in one illustrative embodiment, the latest effective date/time of all of the candidate answers in the first set of candidate answers is identified and used as a timestamp for the first set of candidate answers. For example, if a first candidate answer has timestamp A (e.g., a publication date of a user manual from which the first candidate answer was generated, such as Jan. 9, 2013) and a second candidate answer has timestamp B (e.g., a website forum post date of a statement from a programmer that is the source of the second candidate answer, e.g., Feb. 4, 2014), with A being earlier than B, then timestamp B is selected as the latest timestamp for the set of candidate answers and is used as a first timestamp for evaluation purposes. Of course, in other implementations, different ways of determining an appropriate timestamp for use as the first timestamp may be utilized, e.g., an oldest timestamp of the candidate answers, an average of the timestamps of the candidate answers, or using each timestamp of each candidate answer separately such that the process is repeated for each candidate answer.

This first timestamp is then compared against the timestamps associated with the code change records and source control information in the repository 395 to identify code change records and source control information that was entered, or has an effective date/time, after the sources of the candidate answers in the first set of candidate answers. Thus, only the changes to the code that occurred after the effective date/time of the sources of candidate answers generated from the corpus 345 or corpora 347 are considered for generation of additional supporting evidence and/or new candidate answers by the code change evaluation engine 390.

Having identified the code change records and source control information from the repository 395 that has effective date/times after the effective date/time of the first set of candidate answers, this subset of code change records/source control information is analyzed by performing similar operations as performed by the hypothesis generation state 340 on only this subset of code change records/source control information. The code change evaluation engine 390 takes the extracted features of the input question 310 and the generated queries and applies them to the subset of code change records/source control information from the repository 395 to identify additional candidate answers and/or supporting evidence passages for consideration by the QA system pipeline 300. For example, in applying the extracted features, the code change evaluation engine 390 uses the top ranked keywords/n-grams from the extraction keywords and n-grams from the input question 310 (as may be determined from various metrics including inverse document frequency (IDF), manually identified by a subject matter expert via an input data structure, or the like) and searches the code change records/source control information for matching records/source control information using annotations and annotator logic, and the like. For example, if a top ranked keyword extracted from the input question is "configuration", then this keyword is used as a basis to search for instances of the keyword in the code change records/source control information, e.g., a developer's comments in the code may indicate "changed configuration file load operation" which would be identified as a matching portion of text. Thus, in this example, the corresponding code portion, method, or the like, referenced in the code change records/source control information may be identified as a potential source of the error and possible area for investigation to solve the problem associated with the error.

The matching may involve advanced logic directed to the identification of synonyms, ontologically related terms, antonyms, and the like. The additional candidate answers and/or supporting evidence passages may be provided as a second set of candidate answers and supporting evidence passages to the hypothesis generation 340 stage, the hypothesis and evidence scoring stage 350, and/or final answer and confidence stage 380 for evaluation in combination with the first set of candidate answers and supporting evidence passages.

To illustrate this further, consider an example in which the input question is "How do I load the WhizBang configuration?" The keywords extracted from this question include "How," "do", "load," "WhizBang", and "configuration" (the words "I" and "the" are dropped as "stop words," i.e. words that are too common in the natural language to be useful for differentiating passages having potential candidate answer evidence). Inverse document frequency (IDF) ranking of these terms may be done based on a general search of the terms within documents of a corpus and identifying how often the terms appear in documents in general. Terms with relatively low numbers of instances are more likely to be differentiating with regard to generating candidate answers and evidence passages. In this example, using 1 to be the most useful or highest rank based on IDF, the term configuration is ranked 1, load is ranked 2, WhizBang is ranked 3, how is ranked 4, and do is ranked 5. The terms "how" and "do" are fairly common words and thus, have a relatively low ranking) In a WhizBang infocenter, the term "WhizBang" is likely to be fairly common as well and thus is given a middle level ranking Thus, the terms "configuration" and "load" are the highest ranked keywords from this set of extracted keywords.

As a result, when searching the code change records/source control information, the best search results will be the ones that favor the terms "configuration" and "load". Thus, for example if a first work request is of the type "Configuration won't load from file system" while a second work request is of the type "Document should describe how to do amazing things with WhizBang," the second work request matches 3 of the terms of the input question, but the first work request matches the more highly ranked keywords and thus, is determined to be the best match and will be used to generate a second set of candidate answers or provide additional supporting evidence passages for candidate answers in the first set of candidate answers.

The first and second sets of candidate answers/evidence passages may be evaluated together by the synthesis stage 360 to generate a combined ranked listing of candidate answers and supporting evidence passages which is then processed by the final confidence merging and ranking 370 stages to output a final answer and corresponding confidence value 380. The ranking may take a similar form as previously described in which candidate answers and evidence passages, which includes the code change records/source control information, have associated scores calculated for them based on the occurrences of extracted features of the input question, synonyms, antonyms, ontologically related terms/phrases, and the like, as well as weighting factors that may be applied based on various characteristics including an evaluation of the source of the candidate answer and/or evidence passage, e.g., code change records/source control information may be given a greater weight than other documents in the corpus due to the code change records/source control information being the most recent and up-to-date information.

Alternatively, the code change evaluation engine 390 may generate its own ranked listing of new candidate answers in the second set of candidate answers and provide this to the final confidence merging and ranking stage 370 for generation of a final answer and confidence score. Moreover, in another illustrative embodiment, the code change evaluation engine 390 may generate its own final answer from implementing a similar operation as stages 340-380 and provide it in addition to the final answer and confidence 380 generated by the main QA system pipeline 300 comprising stages 310-380.

The scoring/ranking of the additional supporting evidence and candidate answers may involve various algorithms to evaluate various elements of the matching supporting evidence with these various elements being weighted according to various weights as may be determined through a machine learning operation. For example, the various elements that may be evaluated during scoring/ranking include, but are not limited to:

1) a search engine ranking based on raw matching term evaluation;
2) inverse document frequency (IDF) of search term/n-gram;
3) age of results with newer code change records/source control information being given higher ranking;
4) a number of lines of code (LOC) in the code change;
5) whether a matching part of a class/method in the candidate answer/evidence is directly in the stack trace of the input question 310 (e.g. stack trace indicates ClassA::Line 100 and the matching part in the candidate answer/evidence is ClassA::Line 100);
6) whether a matching part of a class/method in the candidate answer/evidence is directly "near" the stack trace (e.g., stack trace indicates ClassA::Line 100—near this stack trace identifier may be considered the previous X number of lines before or after the identified line, e.g., lines 70-99);
7) evaluation of which terms led to considering the candidate answer (e.g., whether the term was in the question, the candidate answer text itself, or another portion of the source document or information content, etc.); and
8) evaluation of the minimum "distance" of the class/method in the candidate answer or supporting evidence to classes/methods specified in the stack trace of the input question.

The evaluation and weighting of these various elements may be used to calculate a score or rank for the candidate answer/supporting evidence which is then used to rank the candidate answer relative to other candidate answers in the first and/or second set of candidate answers. From this ranked listing of candidate answers, a final answer may be selected based on the rankings, e.g., a top ranked candidate answer may be selected, a predetermined number of candidate answers from the top of the ranked list may be selected, or the like.

In one illustrative embodiment, the code change evaluation engine 390 may not only evaluate the subset of code change records and source control information in the repository 395 based on the extracted features from the input question 310, but may also extract additional features from the first set of candidate answers generated by the QA system pipeline 300 based on the evaluation of the pertinent domain in the corpus 345 or corpora 347. In this embodiment, the code change evaluation engine 390 further evaluates a candidate answer in the first set of candidate answers by using it as a basis for identifying additional supporting evidence that this candidate answer may be correct or incorrect or to further extrapolate on the candidate answer. Thus, for example, if the question has extracted features "configuration file", "loading", and "boot sequence", and the candidate answer suggests that the answer includes an additional feature "initialization method" then the code change evaluation engine may use all of the features "configuration file", "loading", "boot sequence", and "initialization method" when evaluating the subset of code change records and source control information. This will be made more clear in the examples that follow.

Figure 4:
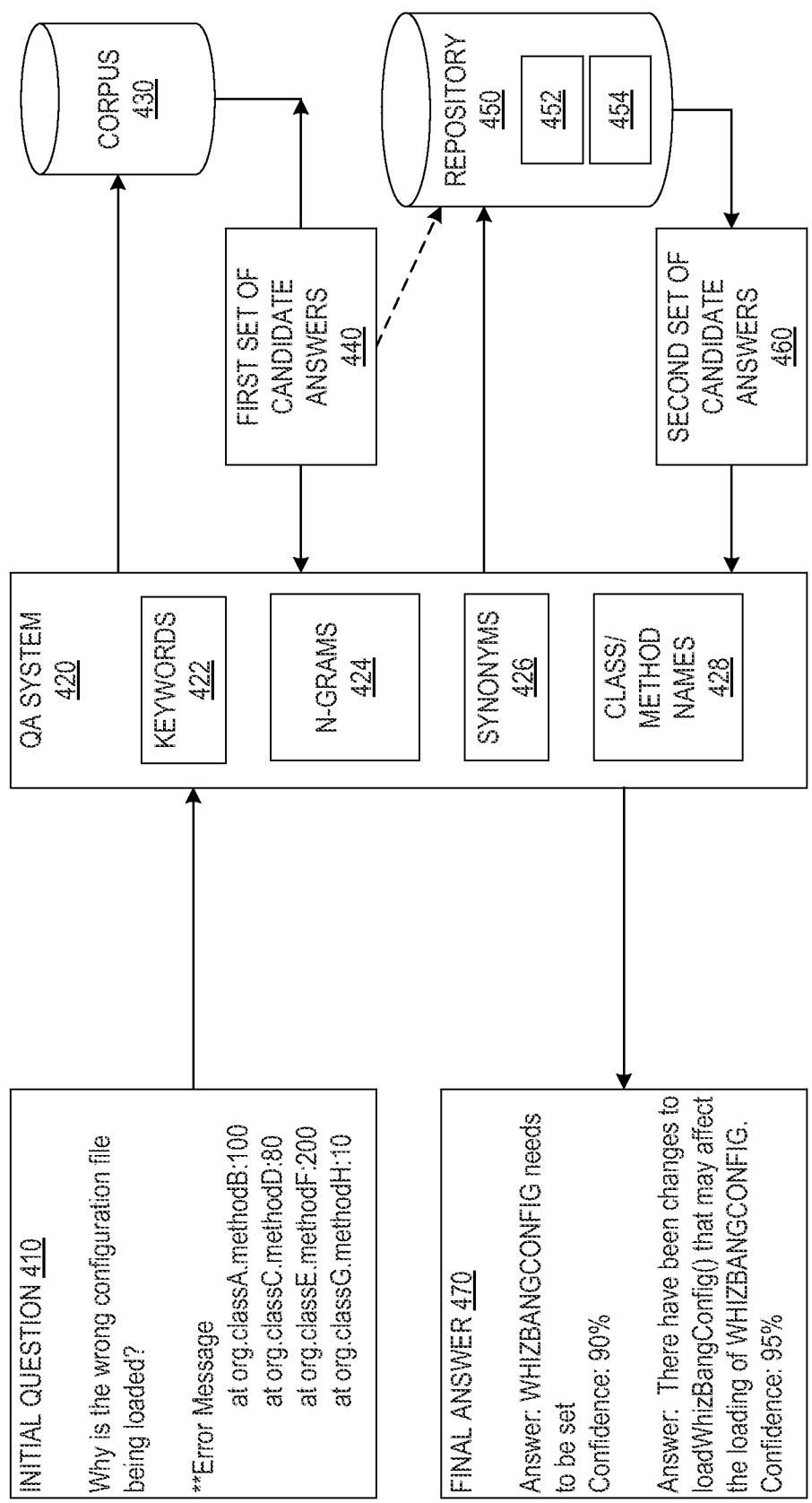
FIG. 4 is an example of the operation of one illustrative embodiment of the present invention with regard to an example scenario.

To further illustrate the operation of the present invention, FIG. 4 is provided as one example of one illustrative embodiment of the present invention with regard to an example scenario. In this example scenario, a software product, the WhizBang 1.0 application, requires that a user set a system property, WHIZBANGCONFIG, which points to a configuration file for the WhizBang 1.0 application. A new version of the software product, i.e. the WhizBang 2.0 application, is being developed and the developers have introduced a new configuration loading mechanism with several different ways to point to the configuration file (the system property has lower precedence).

With this scenario in mind, a developer may ask the question "Why is the wrong configuration file being loaded?" with regard to the WhizBang 2.0 application under development, and attach with the question an error message, error log, or the like, as shown in FIG. 4 in element 410. The QA system 420 operates on the input question 410 to extract keywords 422, n-grams 424, synonyms 426, class/method names 428, and the like. Thus, for example, in the question above, extracted features may include the keywords "wrong," "configuration file", "loaded", a focus of the question, a lexical answer type (LAT) of the question, and the like. These extracted features 422-428 are used to perform a search of initial corpus 430 (infocenter, user manuals, development notes, etc.) directed to the documentation of WhizBang 1.0 application and generate a first set of candidate answers 440.

The QA system 420 further determines the code change records 452, identifying updates to the code of WhizBang 1.0, which is now the code of WhizBang 2.0 under development, and work items identifying change source information 454 in the code change/source control repository 450 that have effective date/time (timestamps) that are after the effective data/time of the candidate answers 440, e.g., after an oldest, most recent, average, or the like, effective timestamp of the candidate answers 440, depending on the particular implementation. This subset of records/information 452/454 is then processed using the extracted features from the input question 410, such as those described above, for example, and additional extracted features from the first set of candidate answers 440 to generate a second set of candidate answers 460. For example, a candidate answer in the first set of candidate answers may be of the type "WhizBangConfig property not set" with the extracted features of this candidate answer being "WhizBangConfig", "property", and "set," and being used as additional features for generating the second set of candidate answers based on the subset of records/information 452/454. These features may be used to search the subset of records/information 452/454 for text matching these features, either explicitly, as synonyms, or the like. Thus, for example, if a code change record stated "Allow overwrite of WhizBangConfig" then this code change record would be identified as a possible source of evidence for the candidate answer in the first set of candidate answers or may be associated with a new candidate answer.

The second set of candidate answers 460 may be ranked independently, or in combination with the first set of candidate answers 440, such as according to score generated for the candidate answer based on a degree of matching or supporting evidence for the candidate answers, to thereby generate a ranked set of one or more final answers to the input question 470. The final answer 470 may be a combination of a candidate answer from the first set and a candidate answer from the second set in some implementations, such that the candidate answer from the first set is provided as a final answer with the candidate answer from the second set being used to further elaborate on the candidate answer from the first set, e.g., the first candidate answer may be that "WHIZBANGCONFIG needs to be set" and the second candidate answer may elaborate on this by stating that "There have been changes to loadWhizBangConfig( ) that may affect the loading of WHIZBANGCONFIG". In such a case, both are final answers to the input question, but are combined to provide an overall view of the most likely source of the error and why this is considered the most likely source of the error. This is further illustrated in FIG. 5.

FIG. 5 is an example diagram of an output that may be generated in accordance with one illustrative embodiment. As shown in FIG. 5, an input question is provided to the QA system asking "Why will WhizBang 2.0 not start up on my Power system?" and a stack trace is provided along with the question where the stack trace indicates the problem being "Cannot read WHIZBANGCONFIG value at WhizBangLoader.loadWhizBangConfig:47 at WhizBangStartup.initialize:13". In response to the input of this question and stack trace, the QA system evaluates the corpus 345 of documents directed to the documentation of WhizBang 1.0 (which is a prior version of WhizBang 2.0 currently under development) and determines that there are two potential answers to the input question, one being that WHIZBANGCONFIG property has not been set properly with the supporting evidence from the corpus (infocenter) being a statement in the documentation indicating "Must set WHIZBANGCONFIG environment variable." The other potential answer is that the application needs to be run on a Linux system with the supporting evidence being a statement in the user manual documentation that WhizBang 1.0 must be run on the Linux operating system.

With the mechanisms of the illustrative embodiments, however, the code change evaluation engine 390 further evaluates code change records/source control information repository 395 for additional information regarding changes to the code, e.g., changes implemented in WhizBang 2.0 based on the previous code state in WhizBang 1.0, or requests to change the code (such as in work items stored in the source control information repository), that have occurred since the documentation in the corpus 345 was generated and determines that a there was a change request 146 requesting that the code be modified to allow overriding the WHIZBANGCONFIG parameter, there is a change set 200 that made several updates to loadWhizBangConfig( ) and a change set 202 that updated the readCommandline( ) method which is called by loadWhizBangConfig( ) (these change sets may be linked to the change request and thus, may implement the change request, for example). Thus, changes to either loadWhizBangConfig( ) or readCommandline( ) may be the potential source of the error and the solution is properly setting the WHIZBANGCONFIG environment variable. This greatly assists the developer in knowing where to focus his/her efforts in rectifying the problem with the WhizBang 2.0 software product development project.

Figure 6:
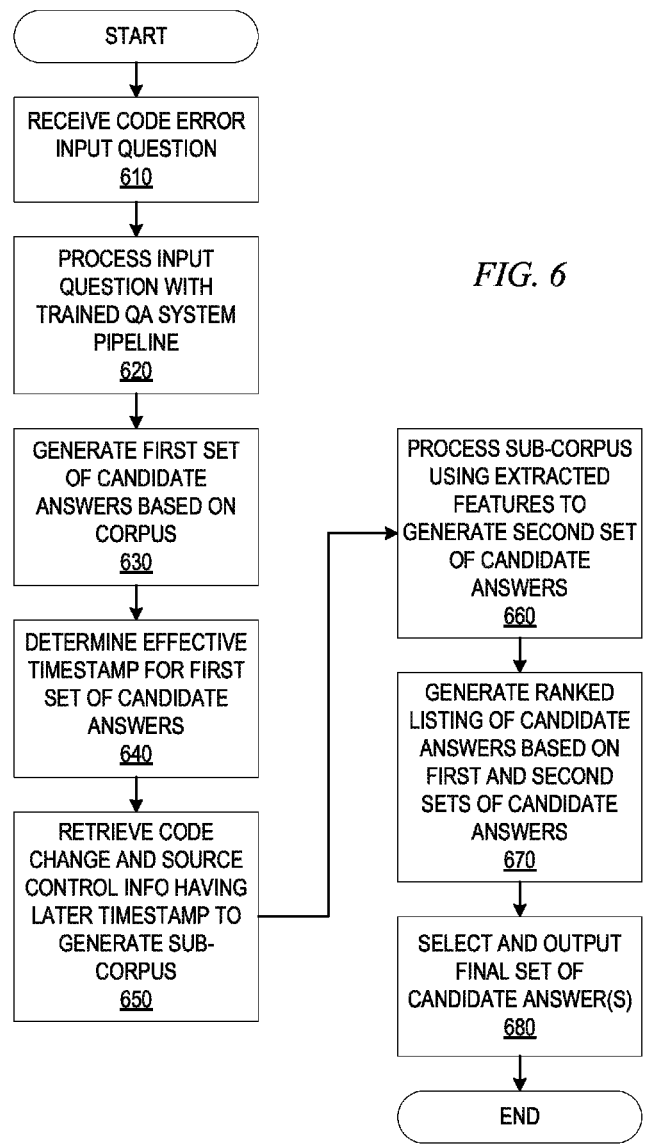
FIG. 6 is a flowchart outlining an example operation of a QA system pipeline implementing a code change evaluation engine in accordance with one illustrative embodiment.

FIG. 6 is a flowchart outlining an example operation of a QA system pipeline implementing a code change evaluation engine in accordance with one illustrative embodiment. The operation outlined in FIG. 6 may be implemented in logic executed as part of a QA system pipeline, such as QA system pipeline 300 in FIG. 3 which integrates the code change evaluation engine 390. Thus, the operation outlined in FIG. 6 may be implemented in software executing on one or more processors of one or more data processing systems, computing devices, or the like, may be implemented in hardware, such as via dedicated circuitry for implementing the various operations, or may be implemented in a combination of software and hardware.

It is assumed for purposes of the description of the operation in FIG. 6 that the QA system pipeline has been trained using a corpus or corpora of documentation and information content pertaining to one or more software products or projects of one or more domains, e.g., user manuals, development notes, website postings, or any other relevant information that may be obtained from sources that provide information about the software products/projects of interest. In some illustrative embodiments, the corpus or corpora may represent out-of-date documentation or information content when compared to a current state of the code that is the source of an error or bug in that the current state of the code includes changes to the code that were not present when the documentation or information content in the corpus or corpora was generated.

As shown in FIG. 6, the operation starts with the QA system pipeline receiving an input question directed to an encountered code error or bug (step 610). The input question may be user generated or automatically generated as a result of execution of the code corresponding to a software product. For example, in an automated embodiment, errors or bugs encountered by the execution of the code may be automatically logged and the log entries may be individually automatically input to the QA system pipeline as input questions. Corresponding debug information may be provided to the QA system pipeline as part of the input question as well, e.g., stack traces, log entry debug information, and the like. Together, this constitutes the input question, which is then processed by the QA system pipeline on the corpus or corpora with which the QA system pipeline has been trained (step 620).

The QA system pipeline generates a first set of candidate answers based on the analysis of the corpus or corpora using the extracted features from the input question (step 630). The candidate answers in the first set of candidate answers have associated timestamps or date/time information associated with the sources of these candidate answers. The timestamps or date/time information for the candidate answers are used to generate an effective timestamp for the first set of candidate answers (step 640). The QA system pipeline then retrieves code change records and source control information from a repository that have timestamps after the effective timestamp of the first set of candidate answers (step 650). The resulting subset of code change records and source control information are processed as a sub-corpus of information by the QA system pipeline such that the extracted features of the input question are applied against the sub-corpus to generate a second set of candidate answers (step 660). In some embodiments, the extracted features that are applied against the sub-corpus may also come from the first set of candidate answers as well as previously discussed above.

The resulting second set of candidate answers is combined with the first set of candidate answers to generate a combined set of candidate answers which are scored and ranked, as previously discussed above, to generate a ranked listing of candidate answers (step 670). A final set of candidate answers comprising one or a predetermined number of candidate answers from the ranked listing, is displayed to the submitter of the original input question (step 680). Alternatively, if the input question was generated automatically, the final answer(s) may be logged and stored in association with the error log for future evaluation. The operation then terminates.

Thus, the illustrative embodiments provide mechanisms for providing greater insight to software developers by identifying potential sources of errors/bugs in software code and potential solutions to these errors/bugs using the most up-to-date information available on the current state of the code. The mechanisms of the illustrative embodiments achieve these results by utilizing code change record and source control information corresponding to the most recent changes to the code to augment the established documentation for the current or previous versions of the code. Thus, the QA system is utilizing the most up-to-date available information about the operation and state of the code when answering questions regarding errors or bugs encountered with the execution of the code.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a Question and Answer (QA) system comprising a processor and a memory, for debugging code, the method comprising:

receiving, by the QA system, an input question identifying an error encountered during execution of code;

processing, by the QA system, the input question using a corpus of information content corresponding to a software product associated with the code to generate a first set of candidate answers for the input question;

processing, by the QA system, the input question using a code change record repository identifying changes to the code performed over time to generate a second set of candidate answers for the input question;

generating, by the QA system, a final answer to the input question based on the first set of candidate answers and the second set of candidate answers; and outputting, by the QA system, the final answer to the input question, wherein the final answer to the input question identifies at least one of a source, in the code, of the error or a solution to resolving the error, wherein processing the input question using a code change record repository comprises:

determining an effective date/time of first evidence passages, from the corpus of information content, used to generate the first set of candidate answers for the input question;

identifying one or more second evidence passages from the code change record repository having corresponding timestamps that are later in time than the effective date/time of the first evidence passages; and generating the second set of candidate answers for the input question based on the one or more second evidence passages, and wherein identifying the effective date/time of the first evidence passages comprises;

comparing dates/times associated with each of the first evidence passages to generate a comparison result, wherein the comparison result identifies at least one of a latest date/time of evidence passages within the first evidence passages, an oldest date/time of evidence passages within the first evidence passages, and an average of date/times associated with evidence passages within the first evidence passages; and setting the effective date/time for the first evidence passages to a value corresponding to the comparison result.

2. The method of claim 1, wherein receiving the input question identifying the error encountered during execution of code further comprises receiving, along with the input question, code error information generated during execution of the code or as a result of the code that identifies characteristics of the error encountered.

3. The method of claim 2, wherein the code error information comprises at least one of stack trace information or error log entries generated in response to encountering the error during execution of the code.

4. The method of claim 2, wherein processing the input question using a corpus of information content comprises:

extracting, by one or more annotators operating on the input question, code debugging features from at least one of the input question or the code error information, wherein each of the one or more annotators comprise logic specifically configured to extract a particular type of code debugging feature.

5. The method of claim 4, wherein extracting code debugging features comprises at least one of:

extracting a class name, method name, or line of code identifier associated with the encountered error;

analyzing a stack trace in the code error information to identify at least one method that was being called at the time of the encountered error; or performing natural language processing on a name of a class or method in a stack trace to identify a nature of the encountered error from text in the name of the class or method.

6. The method of claim 1, wherein:

the software product associated with the code is a previous version of the code, the code is code that is modified from the previous version of the code, the corpus of information content comprises documentation for documenting the operation of the previous version of the code, and the code change record repository identifies differences between the code and the previous version of the code and corresponding effective dates/times of the differences.

7. The method of claim 1, wherein the one or more second evidence passages identify changes to the code that occurred after the effective date/time of the first evidence passages.

8. The method of claim 1, wherein the input question is one of a user entered natural language description of the encountered error or an automatically generated report of the encountered error.

9. A computer program product comprising a computer readable storage medium having a computer readable program stored therein, wherein the computer readable program, when executed on a Question and Answer (QA) system comprising a processor and a memory, causes the QA system to:

receive an input question identifying an error encountered during execution of code;

process the input question using a corpus of information content corresponding to a software product associated with the code to generate a first set of candidate answers for the input question;

process the input question using a code change record repository identifying changes to the code performed over time to generate a second set of candidate answers for the input question;

generate a final answer to the input question based on the first set of candidate answers and the second set of candidate answers; and output the final answer to the input question, wherein the final answer to the input question identifies at least one of a source, in the code, of the error or a solution to resolving the error, wherein computer readable code causes the QA system to process the input question using a code change record repository at least by:

determining an effective date/time of first evidence passages, from the corpus of information content, used to generate the first set of candidate answers for the input question;

identifying one or more second evidence passages from the code change record repository having corresponding timestamps that are later in time than the effective date/time of the first evidence passages; and generating the second set of candidate answers for the input question based on the one or more second evidence passages, and wherein computer readable code causes the QA system to identify the effective date/time of the first evidence passages at least by:

comparing dates/times associated with each of the first evidence passages to generate a comparison result, wherein the comparison result identifies at least one of a latest date/time of evidence passages within the first evidence passages, an oldest date/time of evidence passages within the first evidence passages, and an average of date/times associated with evidence passages within the first evidence passages; and setting the effective date/time for the first evidence passages to a value corresponding to the comparison result.

10. The computer program product of claim 9, wherein computer readable code further causes the QA system to receive, along with the input question, code error information generated during execution of the code or as a result of the code that identifies characteristics of the error encountered.

11. The computer program product of claim 10, wherein the code error information comprises at least one of stack trace information or error log entries generated in response to encountering the error during execution of the code.

12. The computer program product of claim 10, wherein computer readable code further causes the QA system to process the input question using a corpus of information content at least by:

extracting, by one or more annotators operating on the input question, code debugging features from at least one of the input question or the code error information, wherein each of the one or more annotators comprise logic specifically configured to extract a particular type of code debugging feature.

13. The computer program product of claim 12, wherein computer readable code causes the QA system to extract code debugging features by at least one of:

extracting a class name, method name, or line of code identifier associated with the encountered error;

analyzing a stack trace in the code error information to identify at least one method that was being called at the time of the encountered error; or performing natural language processing on a name of a class or method in a stack trace to identify a nature of the encountered error from text in the name of the class or method.

14. The computer program product of claim 9, wherein:

the software product associated with the code is a previous version of the code, the code is code that is modified from the previous version of the code, the corpus of information content comprises documentation for documenting the operation of the previous version of the code, and the code change record repository identifies differences between the code and the previous version of the code and corresponding effective dates/times of the differences.

15. The computer program product of claim 9, wherein the one or more second evidence passages identify changes to the code that occurred after the effective date/time of the first evidence passages.

16. A Question and Answer (QA) system, comprising:
a processor; and
a memory coupled to the processor, wherein the memory comprises instructions which, when executed by the processor, cause the processor to:

receive an input question identifying an error encountered during execution of code;

process the input question using a corpus of information content corresponding to a software product associated with the code to generate a first set of candidate answers for the input question;

process the input question using a code change record repository identifying changes to the code performed over time to generate a second set of candidate answers for the input question;

generate a final answer to the input question based on the first set of candidate answers and the second set of candidate answers; and output the final answer to the input question, wherein the final answer to the input question identifies at least one of a source, in the code, of the error or a solution to resolving the error, wherein the instructions causes the processor to process the input question using a code change record repository at least by:

determining an effective date/time of first evidence passages, from the corpus of information content, used to generate the first set of candidate answers for the input question;

identifying one or more second evidence passages from the code change record repository having corresponding timestamps that are later in time than the effective date/time of the first evidence passages; and generating the second set of candidate answers for the input question based on the one or more second evidence passages, and wherein the instructions cause the processor to identify the effective date/time of the first evidence passages at least by:

comparing dates/times associated with each of the first evidence passages to generate a comparison result, wherein the comparison result identifies at least one of a latest date/time of evidence passages within the first evidence passages, an oldest date/time of evidence passages within the first evidence passages, and an average of date/times associated with evidence passages within the first evidence passages; and setting the effective date/time for the first evidence passages to a value corresponding to the comparison result.

* * * * *